United States Patent [19]

Apostolos

[11] Patent Number: 4,992,796

[45] Date of Patent: Feb. 12, 1991

[54] COMPUTED-INTERFEROMETRY RADAR SYSTEM WITH COHERENT INTEGRATION

[75] Inventor: John T. Apostolos, Merrimack, N.H.

[73] Assignee: Lockheed Sanders, Inc., Nashua, N.H.

[21] Appl. No.: 482,164

[22] Filed: Feb. 20, 1990

[51] Int. Cl.[5] ............................................. G01S 13/48
[52] U.S. Cl. .................................. 342/156; 446/174; 446/424; 446/463
[58] Field of Search ................ 342/156, 446, 58, 108, 342/174, 189, 423, 424, 464, 463, 465

[56] References Cited

U.S. PATENT DOCUMENTS

| | | | |
|---|---|---|---|
| 3,290,677 | 12/1966 | Jacob | 342/23 |
| 3,510,871 | 5/1970 | Watanabe et al. | 342/156 |
| 3,540,053 | 11/1970 | Sparagna et al. | 342/446 |
| 3,540,054 | 11/1970 | Broderick | 342/424 |
| 3,568,193 | 3/1971 | Barton et al. | 342/156 |
| 3,686,670 | 8/1972 | Callendar et al. | 342/417 |
| 4,494,118 | 1/1985 | Graves | 342/424 |
| 4,639,733 | 1/1987 | King et al. | 342/424 |
| 4,673,944 | 6/1987 | Graves | 342/424 |
| 4,701,762 | 10/1987 | Apostolos | 342/417 |
| 4,771,290 | 9/1988 | Storey, Jr. | 342/458 |

OTHER PUBLICATIONS

N. Saucier and K. Struckman, "Direction Finding Using Correlation Techniques," in Proc. IEEE Antennas Propagat. Soc. Int. Symp., pp. 260-263, Jun. 1975.

Primary Examiner—Thomas H. Tarcza
Assistant Examiner—John B. Sotomayor
Attorney, Agent, or Firm—Nutter, McClennen & Fish

[57] ABSTRACT

In a radio-frequency radar system, a radar antenna (12) irradiates a region to be monitored, and antenna elements (14a-p) arrayed irregularly about a mobile platform (10) receive the resultant echo signal, which mixers (18 and 21) translate in frequency, coherently with the transmitted signal, to a lower frequency, at which a sample-and-hold circuit (24) can sample it. A beam-forming operation is performed on the sample signals by employing coefficients that have been computed from calibration readings taken by the elements mounted on the platform. The beam signals resulting from numerous successive transmitted pulses are then integrated coherently to produce an output.

3 Claims, 2 Drawing Sheets

COMPUTED-INTERFEROMETRY RADAR SYSTEM WITH COHERENT INTEGRATION

BACKGROUND OF THE INVENTION

The present invention is directed to radar systems. It has particular application to over-the-horizon target detection and tracking from mobile platforms.

Although radar systems have been extensively studied and improved for over half a century, the goal of acquiring over-the-horizon targets from mobile platforms such as ships has remained elusive. The difficulty arises from two major problems.

The first problem is surface-wave attenuation. In order to obtain the desired directional resolution, the wavelengths used for radar by mobile platforms such as ships have been in the microwave range. But surface-wave mode propagation of microwaves is nonexistent for all practical purposes, so microwaves do not provide over-the-horizon target acquisition. On the other hand, in order to obtain enough directionality with the longer-wave radiation for which surface-wave propagation is significant, it has been necessary to employ phased-array systems that, because of the irregular topology of the typical ocean vessel, have heretofore been impractical for such platforms.

The second problem is noise. A radar operating in a surface-wave mode at sea encounters a lot of reflections from ocean waves, which in the aggregate greatly overwhelm the returns from all but the largest targets of interest. The presence of many over-the-horizon radiation sources in the lower-frequency regions of the spectrum compounds this problem.

As a consequence of these difficulties, low-flying targets located over the horizon have been essentially immune to detection from mobile platforms.

SUMMARY OF THE INVENTION

The present invention provides an effective way for mobile platforms such as ocean-going vessels to locate over-the-horizon targets by radar. According to the present invention, beams are formed by "computed interferometry" from the outputs of antenna elements disposed in an irregular array about a topologically inconvenient platform such as a naval vessel. In computed interferometry, the radar system is initially calibrated by irradiating the array from each of a plurality of calibration directions. For each direction, calibration outputs are recorded that represent the relative amplitudes and phases of the resultant element outputs. Then, for each of a plurality of desired beam patterns, coefficients are computed that result in approximately the desired pattern when they are applied to the calibration quantities.

To acquire a target, a radiation source transmits radiation whose wavelength is great enough for significant surface-wave propagation. The element coefficients computed for a given beam pattern are then applied to the outputs of their respective receiving antenna elements, and the result is an approximation of the signal that would result from the given beam pattern.

The process of irradiating and beamforming is then repeated rapidly a large number of times, and the results are coherently integrated so that radar echoes from a given target reinforce each other but radiation from non-echo sources tends to add incoherently.

In this manner, a mobile platform can achieve the desired directionality in acquiring over-the-horizon targets even though many competing sources on the same wavelength are present. Further discrimination can be achieved by encoding the transmitted signal and then filtering received signals with a filter matched to the encoding scheme. To discriminate fast-moving targets from slow-moving clutter, Doppler filtering can be employed.

BRIEF DESCRIPTION OF THE DRAWINGS

These and further features and advantages of the present invention will be described by reference to the accompanying drawings in which.

DETAILED DESCRIPTION OF AN ILLUSTRATIVE EMBODIMENT

Figure 1:
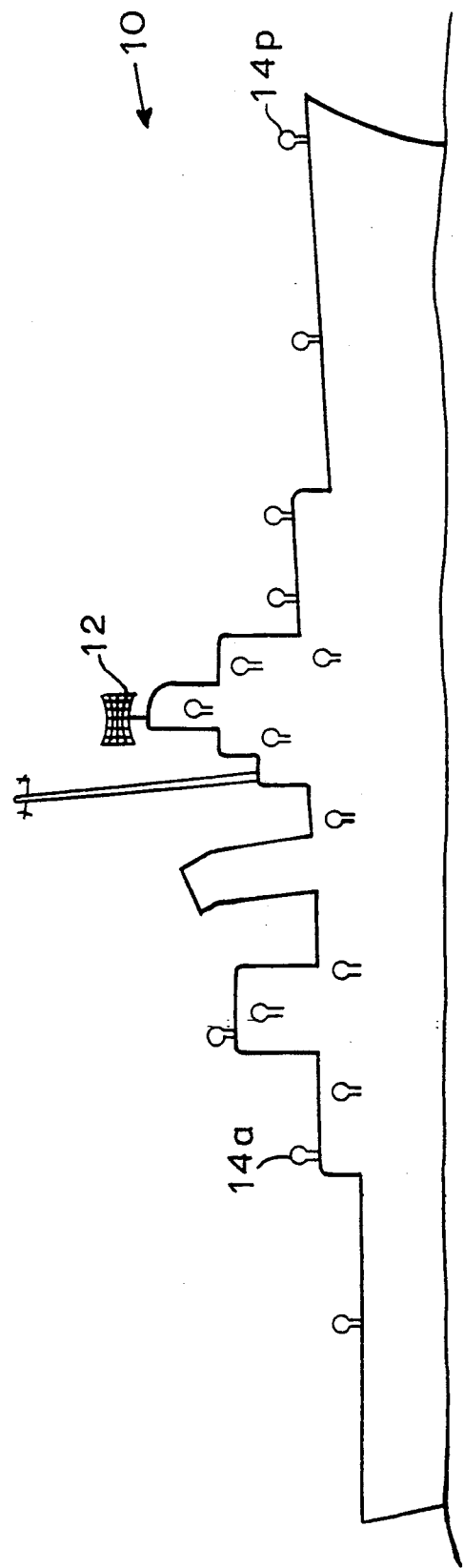
FIG. 1 is a diagram of a ship on which antenna elements are disposed that can be used in the radar system of the present invention.

FIG. 1 depicts a ship 10 provided with a transmitting radar antenna 12 and sixteen receiving antenna-array elements 14$a$–$p$. Antenna 12 is typically an isotropic or other low-directionality radiator, although low directionality is not a requirement of the present invention. Antenna 12 is preferably designed for broad-band radiation, spanning a frequency band of, say, 15–30 MHz, a band in which significant ground-wave propagation occurs. Antenna 12 may, for instance, be a log-periodic antenna. The antenna elements 14$a$–$p$ may simply be loop antennas a few centimeters in diameter. Their outputs are processed in a manner that will now be described in connection with FIG. 2.

Figure 2:
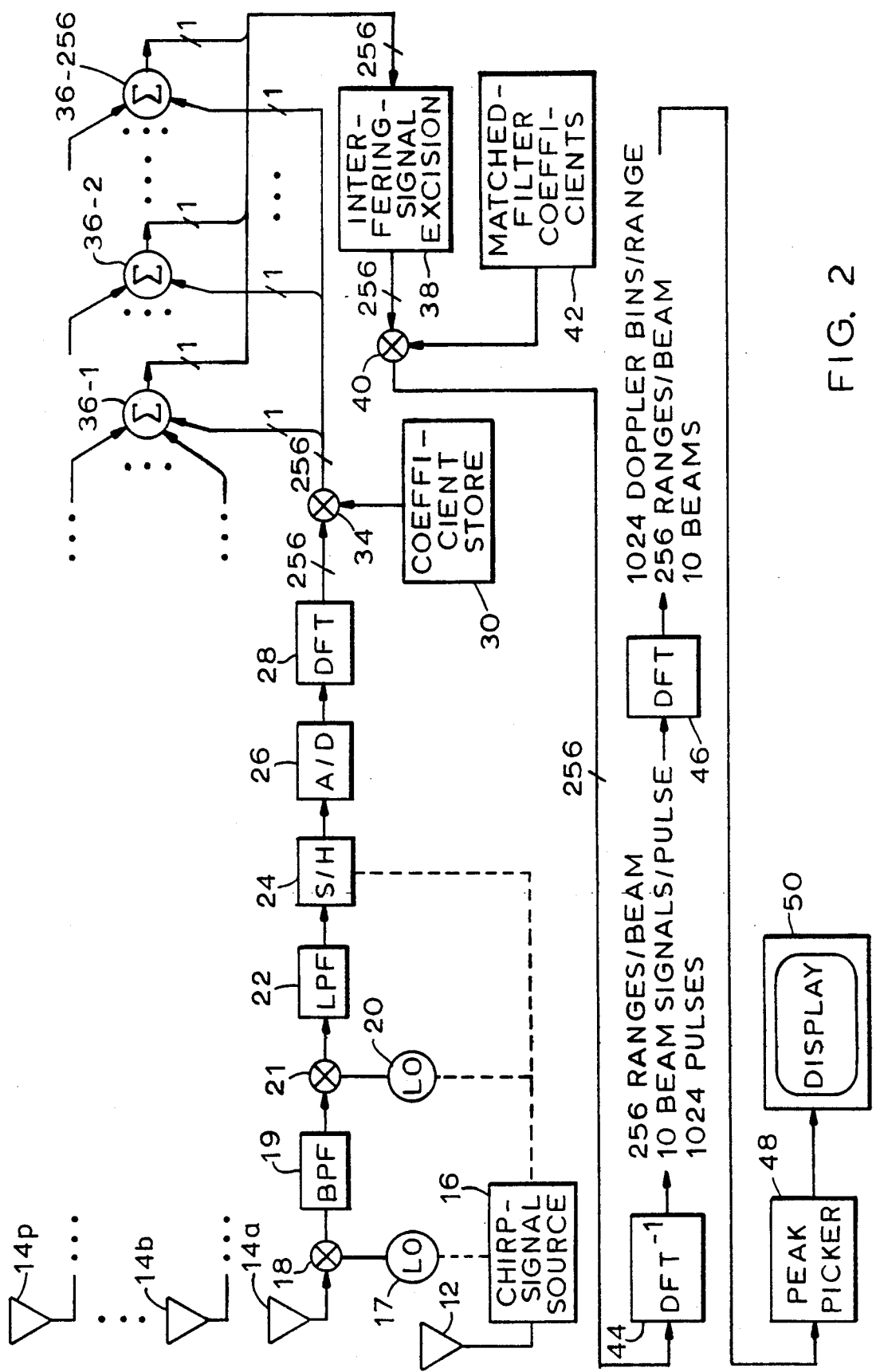
FIG. 2 is a block diagram of the radar system of the present invention.

FIG. 2 depicts a signal source 16 for driving the transmitting antenna 12. The source 16 may, for instance, generate pulses of radio-frequency signals somewhere in the 15–30 MHz band at a pulse repetition rate of, say, 2 kHz. Preferably, the pulses are coded. For instance, they may be 100-$\mu$sec.-long pulses that are "chirped" in instantaneous frequency through a range that is, say, 250 kHz wide.

At the receiving end, the system translates the pulsed oscillations to baseband, performing the translation in two steps to insure image rejection. A local oscillator 17, which is synchronized with the chirp-signal source, applies its output to a first mixer 18 associated with each antenna element 14. The other input of each first mixer is the output of its associated antenna element. A bandpass filter 19 reduces the frequency range of the resultant intermediate-frequency signal to the 250-kHz width of the chirp signal. A second synchronized local oscillator 20 and mixer 21, together with a low-pass filter 22, translate the filtered signal down to baseband, applying the resultant signal to a 530-kHz sample-and-hold circuit 24. An analog-to-digital converter 26 converts the resultant samples to digital form, and these digital signals are then processed, typically by a computer, in a manner depicted in the remainder of FIG. 2. For the large number of computations involved, a personal computer would typically need to be enhanced with a couple of array processors.

In general, the sample-and-hold circuit 24 and analog-to-digital converter 26 together provide a record approximately 200 $\mu$sec. long after each transmitted pulse. As will be explained presently, the processing depicted in the remainder of FIG. 2 forms a beam from this 200-$\mu$sec. record. For each such record, the process of FIG. 2 is performed ten times with different coefficients to form ten different beams, each of which is oriented in a different direction.

The signals associated with these beams are then stored, and the entire process of forming ten beams is repeated 1024 times so that for each range in each beam signal there are 1024 values. A Fourier transformation is performed on the 1024 values. This has the effect of coherently integrating the 1024 values and segregating them into Doppler bins so that the system can discriminate between slow-moving clutter and targets of interest, which typically move at a relatively high speed.

We now turn more specifically to the manner in which this processing is performed. The beamforming occurs in the frequency domain, so the computer performs a discrete Fourier transformation (DFT), represented by block 28 of FIG. 2, to generate 256 DFT points. That is, block 28 represents the transformation into the frequency domain of the time-domain input record that follows a single transmitted pulse. For each receiving antenna element, the computer's memory includes a coefficient store 30 whose contents, determined in an initial calibration operation by optimization techniques, are those required to form a predetermined beam. Each of the 256 DFT values is multiplied by a corresponding coefficient in a multiplication step represented by multiplier 34. The result is 256 products for each antenna element 14.

To form the beam, the products that result from corresponding frequency components from all of the antenna elements 14a-p are added together in steps represented by sixteen-addend adders 36-1 through 36-256. The result is a 256-point DFT of the beam signal.

As was stated above, the transmitted signal is preferably a chirped, or spread-spectrum, signal, which includes frequency components whose amplitudes change only gradually with frequency. Accordingly, if any large spikes in frequency occur in the received signal, they are likely to be the results of narrow-band sources, not echoes of the transmitted signal. To reduce or eliminate the effects of such narrow-band sources, an interfering-signal-excision step 38 is employed. In this step, a moving frequency window of, say, six adjacent frequency bins is examined to determine whether the contents of any single bin exceeds the window average by more than, say, 500%. If so, that frequency component is set to zero so that it does not affect subsequent computations. Because of the possibility of such high-amplitude signals, the input digital-to-analog converters 26 should have high dynamic ranges, so I prefer to use fourteen-bit converters.

In a step represented by multiplier 40, the 256 values of the modified DFT are multiplied by corresponding filter coefficients from a coefficient store 42 to apply to this DFT a filter matched to the chirp signal. The corresponding time-domain operation would be the use of a dispersive delay line to re-compress the chirp signal. The output of step 40 is thus sensitive to echoes of the transmitted chirp signal and insensitive to signals from other sources, which tend not to be characterized by the same frequency band and chirp rate. Then, in a step represented by block 44 of FIG. 2A, the beam signal is transformed back to the time domain in an inverse DFT step 44.

The resultant time-domain signal is stored, and the same input record is then subjected again to the same series of steps, with the exception that the coefficients fetched from the coefficient store 30 are those calculated for a beam pattern pointed in a different direction. This operation is performed, say, ten times to form beam signals representing ten different beam patterns. The result of each transmitted pulse is thus ten 256-point time-domain signals, each one representing the beam signal corresponding to a different beam pattern.

The chirp-signal source 16 transmits pulses at a pulse-repetition rate of 2 kHz in pulse trains 1024 pulses long. (After each pulse train, the source 16 may change frequencies, but all pulses in the same pulse train are identical.) Consequently, the result of each pulse sequence is a set of 1024 256-point beam signals for each beam pattern. Each of the 256 values in a 256-point beam signal represents a different range. For each range in each of the ten beams, the step represented by block 46 performs a 1024-point DFT through the set of 1024 signals that represent that beam.

For example, the one-hundredth value in a beam signal for a given beam is grouped in a time sequence with the one-hundredth values of the rest of the 1024 beam signals for the same beam, and a Fourier transformation of that sequence can be performed to produce 1024 Doppler bins for the range represented by the hundredth beam value. In practice, however, it may be found expedient to dispense with the computation of all but a few selected Doppler bins.

Inspection of FIG. 2 reveals that this arrangement results in coherent integration. The chirp-signal source 16 and the local oscillator 18 are synchronized so that the echo from a target that is stationary with respect to the platform occurs not only at the same time in each cycle but also at the same phase. Consequently, the first DFT value, i.e., that which represents a frequency of zero, results from the in-phase, reinforcing addition of the echoes from such a target throughout the 1024 beam signals that represent the same beam. In contrast, although signals from noise sources that individually may be much higher in amplitude than the echo signals are also added, such signals are added in random phase and thus tend to add incoherently.

The coherent-integration effect is present for moving targets as well. Although the phases of the echoes from such targets change during the 1024-signal sequence because of the relative motion between the target and the platform, the phase advance is steady because the velocity of the target with respect to the platform typically changes only negligibly during the half second required to transmit the 1024 pulses. Therefore, since the DFT coefficients also advance steadily in phase, such a target will result in a significant DFT value in one of the Doppler bins. Non-echo signals, on the other hand, will in general appear in random phase and will thus tend to add incoherently.

Clutter can be eliminated when, as is often the case, targets of interest have significant velocities with respect to the platform. For a 30-MHz transmitter, for instance, clutter downwind in a moderate sea may be very high in about the 0- or 2-Hz frequency bin, but it has dropped off from its high value by about 100 db at the 6-Hz bin. In contrast, a target having a radar cross section of 1 square meter and traveling at 0.15 times the speed of sound at an angle of 45° to the platform produces an overall return more than 60 db down from that of the clutter, but the target return would exceed the clutter return by 30 db in approximately the 8-Hz Doppler bin. Doppler processing therefore acts to discriminate targets of interest from clutter.

The outputs of the Doppler DFT step for all of the beam directions is a function of values in a three-dimensional space in which the dimensions are azimuth, Doppler frequency, and range. In a peak-picking step represented by block 48, the computer looks for local maxima and produces an output indicative of the maximum values and the locations in three space at which they occur. For instance, an output may indicate that one of the maxima is in the beam that represents a bearing of 036, in the 50-kilometer range bin, and in the 8-Hz Doppler-frequency bin. The peak-picking routine might also include a provision for discarding all maxima in Doppler bins between, say, −4 Hz and +4 Hz. In practice, this information might be data-reduced for human use by displaying the azimuth, range, and amplitude information on a radar repeater 50 of conventional form, the Doppler information being used only to filter out returns from targets that are moving too slowly to be of interest.

In the description so far, it has been tacitly assumed that the system is being used in an acquisition mode. In the acquisition mode, the ten beams together cover all bearings, or at least a very wide range of them. When a target is acquired, a human or machine decision may then be made to track the target, and the system goes into a tracking mode, in which different coefficients from store 30 are employed. The new coefficients are used to form much narrower beams, and the selected beams are a set that span a narrow range that includes the target. Tracking then proceeds in a conventional way.

The coefficients in the coefficient store 30 are obtained through an initial calibration of the system. In the initial calibration, the array is in its place on the platform, and a strong source irradiates a number of calibration directions in turn. The calibration operation typically is also performed consecutively at a number of calibration frequencies at which the transmitter is intended to operate during normal operation. In the illustrated embodiment, the transmitter sends chirp signals, and each calibration frequency may be the center frequency of a chirp range. For each combination of frequency and direction, the relative phases and amplitudes of the resultant signals from the antenna elements are recorded, and a computer uses these values to compute the beam-forming coefficients to be placed in store 30.

Specifically, the computer employs an optimization routine to minimize the following quantity at each calibration frequency:

$$\sum_i \left( B_i - \sum_k c_k e_{ik} \right)^2,$$

where $B_i$ is the value of the desired beam pattern in the ith calibration direction, $c_k$ is the coefficient for the output of the kth array element, and $e_{ik}$ is the phasor representation of the output that the kth element produces when the array is irradiated from the ith direction.

If, as was suggested above, the calibration process is performed at only the center frequency of each chirp-signal sweep range, the contents of all the frequency bins resulting from a given DFT operation 28 are multiplied by the same coefficient for a given beam direction, antenna element, and chirp-signal frequency range. This arrangement is based on the assumption that the required beam-forming coefficients do not change significantly in the relatively narrow band of the chirp signal.

If further accuracy is desired, however, the calibration operation can be performed individually for each DFT bin, and the optimization process can be performed individually for each separate bin so that different coefficients are associated with different bins. Alternatively, individual-bin coefficients can be calculated by interpolating between frequencies at which coefficients have been computed by the optimization process.

Although many optimization techniques can undoubtedly be employed to find the values $c_k$ that approximate the desired beam pattern, I prefer the Fletcher-Powell method (R. Fletcher and M. J. D. Powell, Computer J. 6:163 (1963).) I have found that it is beneficial to use, as starting points for the $c_k$'s, the values that provide the least-squares fit to a pattern that is not the desired beam pattern B but rather a rectangular beam pattern whose value is zero outside the half-power points of the desired beam pattern and is unity between them. Use of those $c_k$ values as the starting points reduces the likelihood that the Fletcher-Powell algorithm will settle on a local minimum that is not the global minimum. It also may be found beneficial to add a constraint to the average value of the magnitude of the $c_k$'s so that dynamic-range limitations on subsequent processing are not violated.

Although the transmitting antenna in the illustrated embodiment is separate from the receiving array, it is possible in principle to use the same array for both transmission and reception in the present invention. On the other hand, the transmitting and receiving antennas do not even have to be on the same platform; the transmitting antenna can be on an airplane, for instance, while the receiving array is on a ship. Synchronism would be maintained in such a system by high-stability clocks, and range data would be adjusted for the relative positions of the airplane and ship. Of course, separate calibration operations would also be required for different airplane bearings.

It is apparent from the foregoing description that the system of the present invention provides the first truly effective method of active over-the-horizon target tracking from a mobile platform. It therefore constitutes a significant advance in the art.

I claim:

1. A method of radar detection comprising the steps of:
    (A) providing a platform and an irregular array of antenna elements mounted on the platform for producing electrical element outputs in response to radiation received thereby;
    (B) calibrating the irregular array by:
        (i) irradiating the irregular array with radiation of a calibration frequency from each of a plurality of calibration directions and recording a calibration output, associated with each combination of antenna element and calibration direction, representing the relative amplitude and phase of the electrical element output produced by the associated antenna element in response to radiation from the associated calibration direction; and
        (ii) for each of a plurality of desired beam patterns, computing an element coefficient associated with each antenna element such that the beam pattern that results from application of the element coefficients to the calibration outputs approximates the desired beam pattern;

(C) transmitting radiation of the calibration frequency into a target region so positioned with respect to the platform that it includes area covered by one of the desired beam patterns; and (D) producing a beam signal from the resultant element outputs by employing the element coefficients computed for the desired beam pattern.

2. A method as defined in claim 1 further comprising the (A) performing the step of irradiating the monitored region a plurality of times;

(B) performing the beam-signal-producing step on the element signals that result from each of the irradiating steps so as to produce a plurality of beam signals; and (C) producing a coherent-integration signal by coherently integrating the plurality of beam signals.

3. A method as defined in claim 2 wherein:

(A) the method comprises separately performing the step of irradiating the irregular array with radiation of each of a plurality of calibration frequencies;

(B) the method comprises separately performing the computing step with the calibration outputs that result from the step of irradiating the irregular array at each calibration frequency; and (C) the beam-signal-producing step comprises:
  (i) dividing each element output into frequency components corresponding to different ones of the calibration frequencies; and
  (ii) forming the beam by applying to the frequency components the element coefficients that result from the computing step performed with the calibration frequencies to which the respective frequency components correspond.

* * * * *